Nov. 19, 1940.　　A. L. STONE ET AL　　2,222,206
TURNING AND MILLING MACHINE
Filed Oct. 25, 1938　　7 Sheets-Sheet 1

Inventors
Albert L. Stone,
Jean A. Tytus,
Joseph H. Appleton.

Attorney.

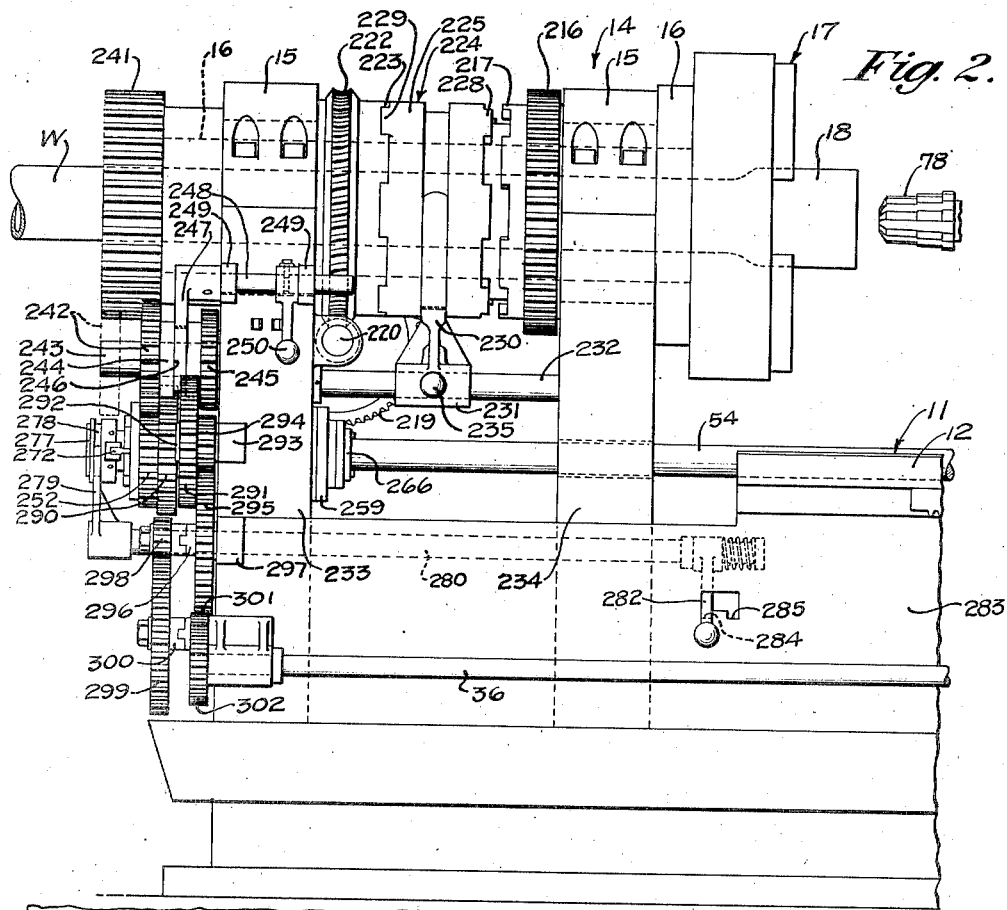
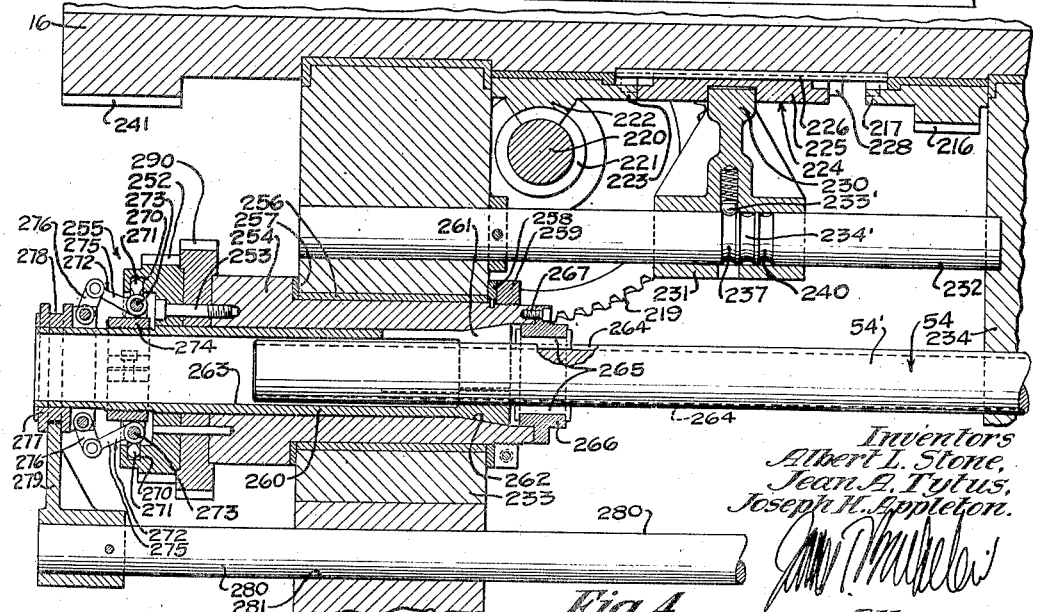

Inventors
Albert L. Stone,
Jean A. Tytus,
Joseph H. Appleton.

Attorney.

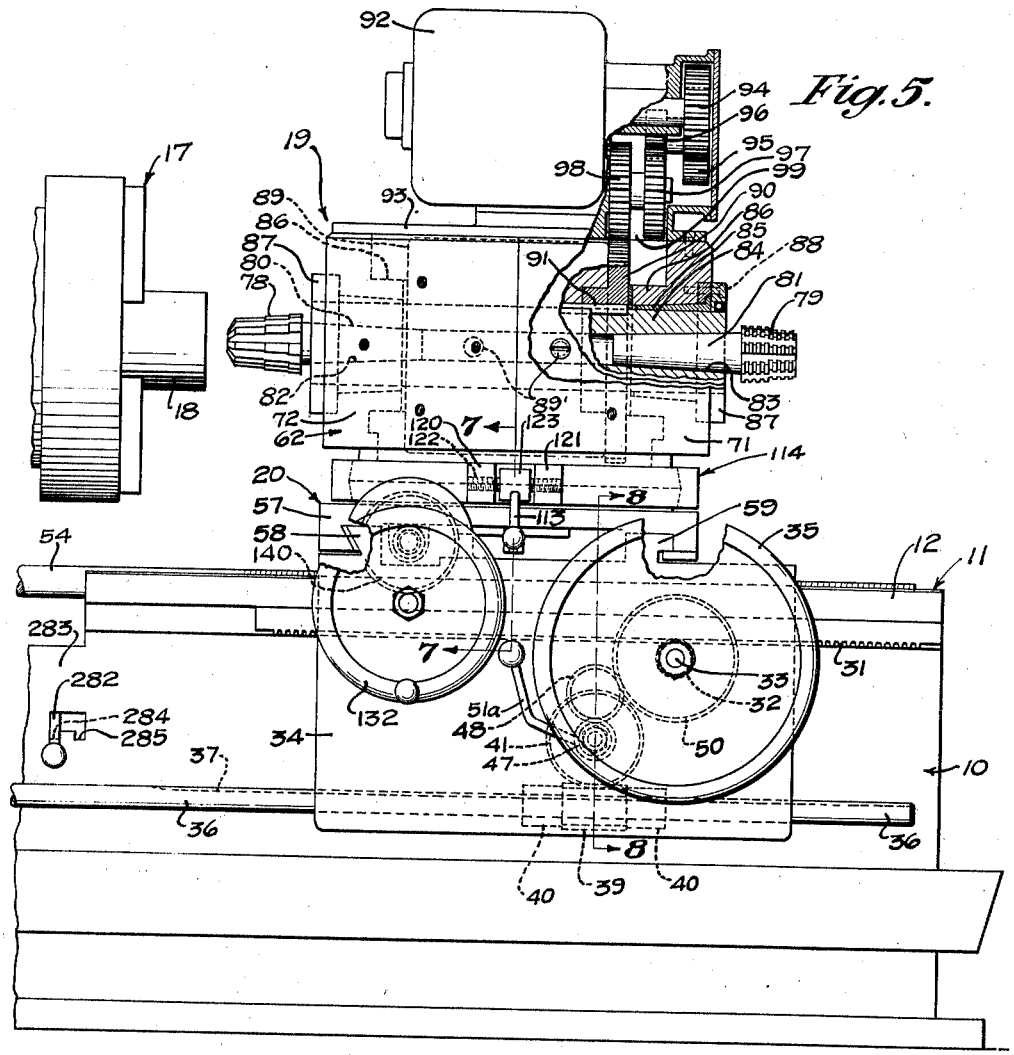

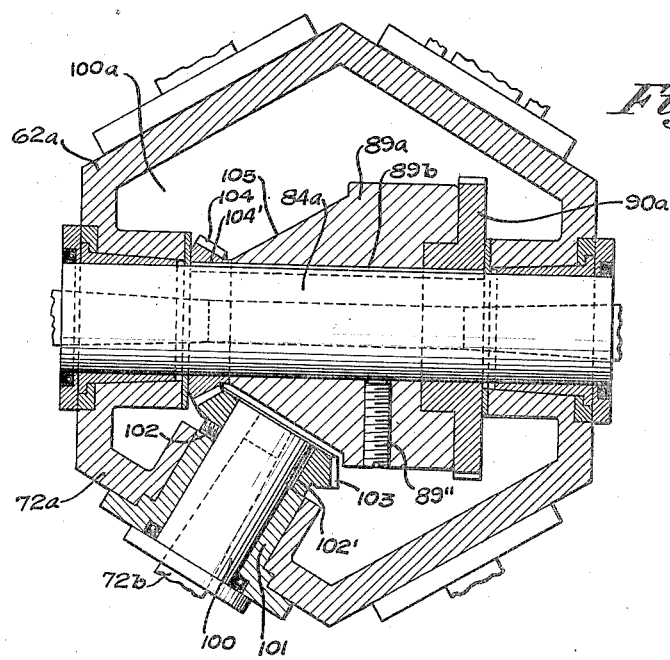
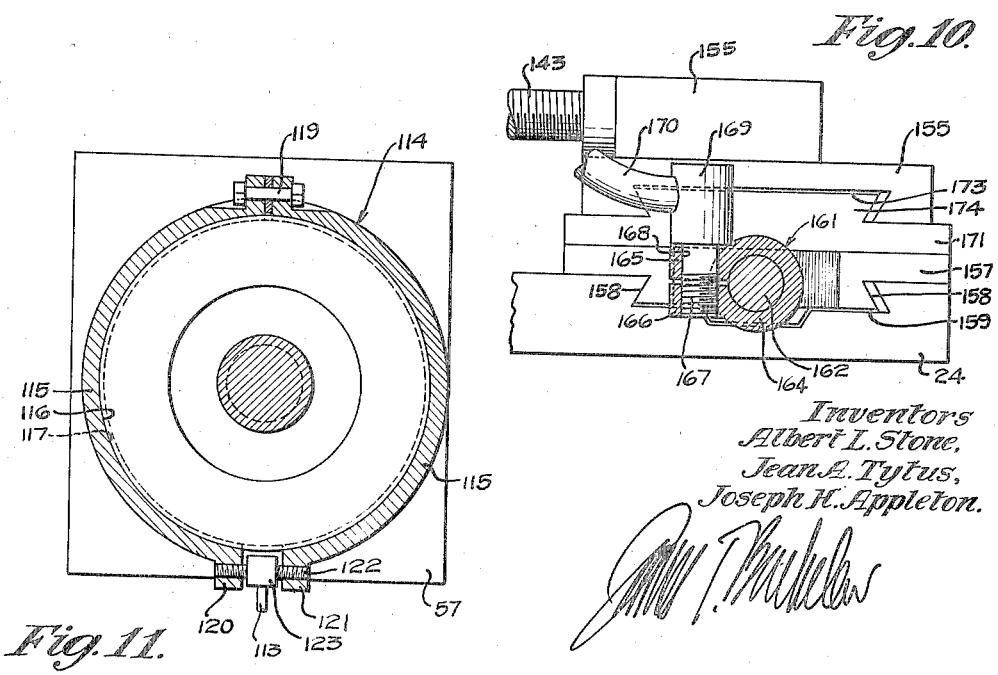

Nov. 19, 1940.   A. L. STONE ET AL   2,222,206
TURNING AND MILLING MACHINE
Filed Oct. 25, 1938   7 Sheets-Sheet 7

Inventors
Albert L. Stone,
Jean A. Tytus,
Joseph H. Appleton.

Attorney.

Patented Nov. 19, 1940

2,222,206

UNITED STATES PATENT OFFICE 2,222,206

TURNING AND MILLING MACHINE

Albert L. Stone, Palos Verdes Estates, Jean A. Tytus, Redondo Beach, and Joseph H. Appleton, Los Angeles, Calif., assignors to Hydril Company of California, Los Angeles, Calif., a corporation of California Application October 25, 1938, Serial No. 236,874

4 Claims. (Cl. 29—46)

This invention has to do generally with machines for performing turning and milling operations, and is more particularly concerned with machines especially adapted to perform such operations on tubular work such as, for example, drill-pipe, tool joints, well casing and the like. The objects and features of the invention may be pointed out to better advantage by considering one specific problem which it solves, though this consideration is to be considered merely as illustrative and is not to be taken at all as inferring that the invention is limited in its advantageous application thereto.

By way of illustration, reference is made to Patent No. 1,932,427 issued October 31, 1933 to Frederick Stone on Well pipe joint and Patent No. 2,006,520 issued July 2, 1935 to Frederick Stone et al. on Casing joint.

In these patents it will be noted that a high degree of dimensional accuracy is required in order that the threaded joints may function properly. Accordingly, the standards of dimensional accuracy are rigid throughout the numerous manufacturing steps. These requirements naturally increase the cost of manufacture and yet this cost must be held down sufficiently to allow a consumer-cost which will lie within competitive limits. Also contributing to the necessity for extreme care in accurately manufacturing the joints is the fact that the threaded box members of the joints are frequently formed in integral, upset ends of the pipe, proper, and that a failure of or deficiency in any given box member renders useless the entire length of the associated pipe, thus representing a loss much greater than that of the box, per se. Likewise, despite the fact that a given box to be machined is of relatively little bulk and longitudinal extent, the entire length and bulk of the integral pipe has to be manipulated during the chucking and machining operations, it following that the difficulties of manufacture are considerably aggravated.

It is therefore among the general objects of the invention to provide a machine which, in spite of the inherent difficulties encountered in this type of manufacture, will fulfill all accuracy requirements with minimum effort and cost.

In machining these particular types of threaded joints, there are required a series of inner and outer truing cuts, shoulder facing cuts, boring cuts, milling cuts, and threading operations, which latter may be most expeditiously and accurately accomplished by thread-milling. In carrying out the "turning" operations, the work is rotated at relatively high speed while the tool is held against rotation, though fed longitudinally of the work. On the other hand, in performing the milling operations, the work is rotated at relatively low speed, while the tool is rotated at relatively high speed and, in most cases, is fed longitudinally in timed relation to the angular velocity of the work. For instance, in thread-milling, the work is slowly rotated through 360° while the rapidly rotating thread mill or hob is moved longitudinally a distance equal to the pitch of the thread to be cut. If the thread is to be tapered, the tool is moved transversely with respect to the work axis in timed relation to the longitudinal movement of the tool.

The characteristics of the "turning" and "milling" operations are thus quite different, and heretofore there has been available no single machine which could expeditiously accompish the functions of both with a single set-up of tools. It has been customary to perform the "turning" operation on a lathe-type machine, leaving sufficient excess stock to allow for later finishing cuts, and then to transfer the work to a "milling" type of machine, where the finishing and threading cuts are accomplished by milling cutters and the like.

This transfer from one machine to another necessitates a second chucking of the work, and in this re-chucking operation, attempt has to be made to line up the work in the second machine just as it was lined up in the first. This attempt at accurate re-chucking is not only expensively time-consuming and difficult to accomplish (as a matter of fact, it is practically impossible to do it with full accuracy) but, in order even to approach required accuracy, the operation in the first machine usually includes an outside or peripheral truing cut to provide a cylindrical surface which is truly centered with respect to the inside boring cuts, said surface being adapted later to be taken within the chuck of the second machine so, if properly re-chucked, the axis of the cut bore coincides with the chuck axis. This exterior truing cut not only represents an extra operation but also reduces the thickness of the box walls, an obvious disadvantage and one which is often practically prohibitive since, in some types of work, the original dimensions of the work are such that there is little or no extra stock to spare. These conditions are well recognized by those familiar with the art.

To overcome such serious problems, we have provided a single machine which has, among its novel and advantageous features, the capacity of performing both "turning" and "milling" types of operations on the work with a single-set-up of the tools. The machine involves the use of a turret upon which may be mounted a plurality of tools, one or more of which may be in the nature of milling cutters adapted to be brought selectively into opposition with the work by rotation of the turret, plus means for driving the turret-carried milling tool or tools and means for properly relating the angular velocity of the work and the bodily movement of the tools to correspond with the particular operation to be performed by each tool as it is put into effective position. Additionally, there are provided on the turret one or more turning tools which are held against rotation and are adapted to be brought selectively into opposition with the work. When these turning tools are in operation, the work-head is capable of being speeded up to give proper turning speeds. Thus, without changing the tool set-up on the turret, and with a single chucking of the work there may be accomplished a complete cycle of machining operations (both turning and milling); all of which contributes greatly to the expedition and high degree of accuracy with which the joint may be manufactured.

The turning and milling operations of a given cycle may be accomplished in any desired order or sequence. For instance, there may be alternately a turning operation and a milling operation, or there may be two or more successive milling operations followed by one or more turning operations. The operator may vary the sequence and number of operations to any extent he may desire within the limits of the particular range or set-up of any given machine—all without losing the benefit of a single chucking of the work.

Also, so far as we are aware, we have provided the first machine by which a plurality of milling operations, each operation calling for the use of a separate milling cutter, may be accomplished expeditiously. We have accordingly directed certain of our sub-combination claims to that feature without involving those claims in any way with the additional novel features of combining non-rotatable cutters with the milling cutters.

Other objects and features of the invention will be made apparent in the following detailed description, reference being had to the accompanying drawings, in which:

Fig. 2 is a side elevation of the head-stock portion of the machine;

Fig. 4 is an enlarged fragmentary section on line 4—4 of Fig. 3;

Fig. 5 is a side elevation of the tool-head portion of the machine, shown partly in broken-away section;

Fig. 7 is an enlarged fragmentary section on line 7—7 of Fig. 5;

Fig. 10 is an enlarged fragmentary section on line 10—10 of Fig. 1;

Fig. 11 is a section on line 11—11 of Fig. 6;

Fig. 15 is a horizontal section of a turret showing a variational embodiment of a portion of our invention.

Figure 1:
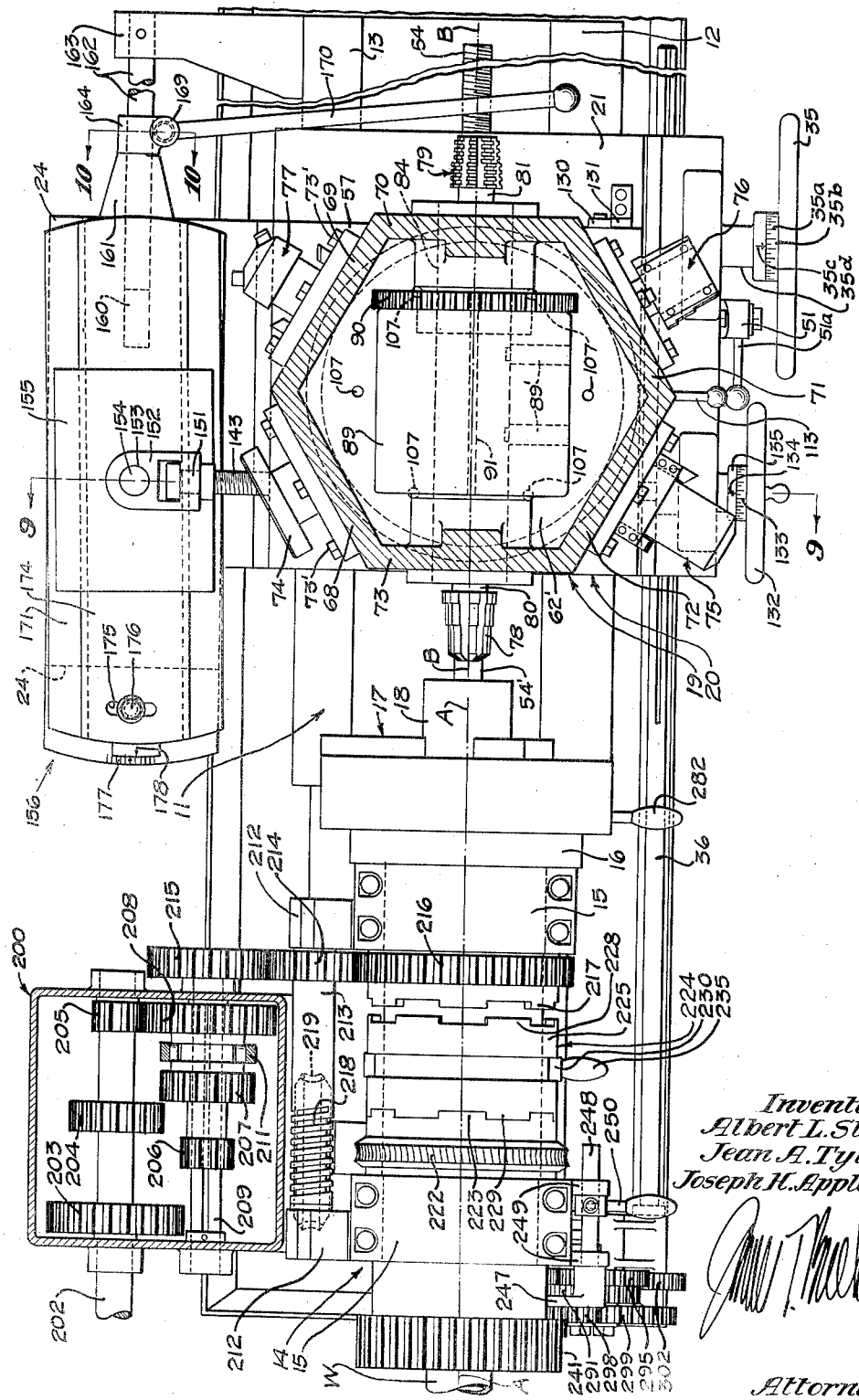
Fig. 1 is a longitudinally contracted plan view, partly in cross section, showing an embodiment of our invention.

While we will describe certain structures and various feed and control mechanisms with some particularity in order to set forth certain operative capacities possessed by a machine embodying our invention, it will be understood this is done for illustrative purposes only and that the invention, considered in its broader aspects, is not limited thereto except for such limitations as the claims may fairly import.

Likewise, while we will set forth certain, typical machining operations which lie within the capacity of the machine, this is not at all to be considered as limiting the scope of our invention as expressed in the claims nor as inferring that the operations must be carried out in the sequence and exact manner described.

At 10 we have indicated a base frame which supports in the usual manner a bed 11 made up of ways 12 and 13 which are properly lined up with the axis A—A of the head-stock generally indicated at 14 which supports, by bearings 15, a hollow, work-taking spindle 16 provided with the usual chuck, conventionally illustrated at 17. We have here indicated the work W as comprising a well pipe with an upset end or box 18 adapted to receive various machining operations which will ultimately produce a threaded joint-part, as described in the introduction to this specification, though, as previously expressed, it is not to be inferred that the machine is limited in its capacity to perform these particular operations. The work is, of course, chucked at 17 so its axis will be coincident with axis A—A of head-stock 14 and spindle 16.

The tool-head is generally indicated at 19 and embodies a carriage generally indicated at 20, which carriage includes a saddle 21 mounted as at 22 on ways 12, 13 (Fig. 9) for sliding movement longitudinally of bed 11. A dove-tail inter-fit 23 between saddle 21 and way 12 is provided at one side of the carriage while a bracket 24 is secured at 25 to the other side of the carriage and has an inward projection 26 which, with its gib 27, engages the underside of overhang 28 on way 13 to hold down said other side of the carriage. Dove-tail interfit 23 and downward projection 29 with its gib 30 serve to hold the carriage against movement transversely of the ways.

Figure 8:
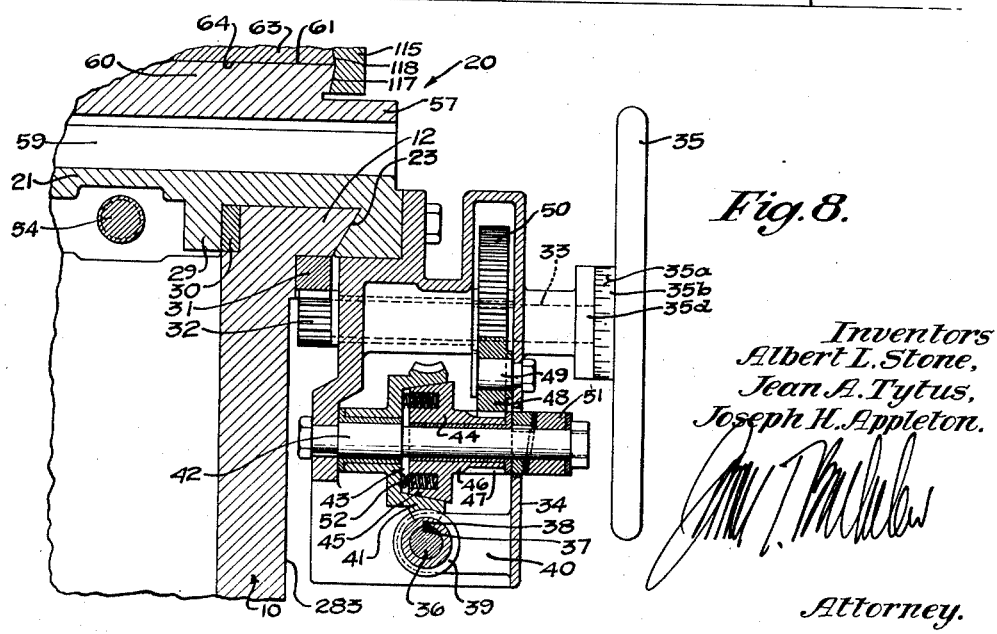
Fig. 8 is an enlarged fragmentary section on line 8—8 of Fig. 5.

On the underside of way 12 is a longitudinally extending feed-rack 31 (Fig. 8) with which is meshed a pinion 32 on shaft 33, the latter being carried by apron 34. On shaft 33 is a usual carriage-traversing wheel 35 whereby pinion 32 may be manually rotated to cause, through its engagement with rack 31, movement of carriage 20 longitudinally of bed 11. Suitably calibrated graduations 35a are provided on wheel-hub 35b, which may be read in connection with indicator mark 35c on apron neck 35d, to guide the operator in measuring distances of carriage-movement along bed 11.

As one means for automatically traversing the carriage, there is provided a feed bar 36 which has a longitudinally extending keyway 37 (Fig. 5)

adapted to take key 38 whereby a worm 39 is held against rotation with respect to the bar, though it is longitudinally slidable thereon. Worm 39 is, in effect, carried by apron 34, being held against longitudinal movement with respect to that apron by brackets 40 (Figs. 5 and 8) which also give sliding bearing for the feed bar.

Meshed with worm 39 is a worm wheel 41 mounted for rotation on shaft 42 which extends transversely of the apron. The feed bar takes its rotative drive from the head-stock in a manner to be described, but it will suffice at this point to state that worm wheel 41 is rotated constantly by worm 39 so long as the feed bar is being driven and irrespective of the position which carriage 20 occupies along bed 11.

A feed bar clutch is generally indicated at 43, being made up of a cone 44 which is rotatable about and slidable longitudinally of shaft 42. This cone is adapted to fit the complementary bore 45 of worm wheel 41, and, when the cone is moved to its extreme leftwise position (Fig. 8) it frictionally engages the worm wheel so the rotation of said wheel is imparted to cone 44. Cone 44 has a shank 46 carrying integral gear 47 which is meshed with pinion 48, the latter being mounted on apron-stud 49 and meshing, in turn, with gear 50 on shaft 33. The usual manually operated clamping cam 51, actuated by handle 51a (Fig. 1) is provided on shaft 42. When this cam is in inoperative position, clutch-springs 52 move cone 44 to the right, as viewed in Fig. 8, to cause release of clutch 43 so the drive from worm wheel 41 is not imparted to cone 44. However, when cam 51 is rotated to operative position, cone 44 is urged into frictional engagement with worm wheel 41 and the rotative drive of that wheel is imparted through cone 44 and gears 47, 48 and 50 to shaft 33, which, in turn, drives pinion 32 over rack 31 and thus causes movement of carriage 20 longitudinally along bed 11.

There is also provided lead-screw means for traversing the carriage in extremely accurate timed relation with the angular velocity of work spindle 16. This means includes a lead-screw 54 (Figs. 1, 4, 7 and 8) supported at its inner end by head-stock 14 (Fig. 4) in a manner to be described later, and at its outer end in a nut 55 which is rigidly secured to the underside of saddle 21 at 56 (Fig. 7). For the present, it will suffice to say that when lead-screw 54 is rotated while being held against bodily longitudinal movement, its threaded engagement with nut 55 causes movement of carriage 20 longitudinally of bed 11 in accurately timed relation to the angular velocity of spindle 16.

A cross-slide 57 is mounted on upstanding saddle-ways 58 and 59, the interfit between cross-slide and ways being of the type clearly shown in Fig. 5 so as to prevent rocking movement and side-play of the slide. Ways 58 and 59 are exactly normal to the longitudinal axis of bed 11.

Slide 57 has a circular platform 60 with a truly horizontal upper face 61, and the hollow turret indicated generally at 62 has a circular base plate 63 whose underface 64 engages platform-face 61. Platform 60 and plate 62 are of equal diameter and are held in concentric relation but capable of relative rotation by means of a downwardly tapering centering cone 65 which has running fit in the complementary bore 66 of platform 60. Annular groove 67 gives vertical clearance between platform and base about cone 65, as clearly shown in Fig. 7.

Disregarding for the time being the means for clamping the platform and the turret against relative rotation and for indexing the angular movement of the turret, it will be seen that side walls 68 to 73, inclusive, of turret 62 define a regular polygon, as viewed in plan though, of course, this shape is not to be considered as limitative on the invention. However it adapts itself particularly well to the purpose in hand. Each of these side walls may be considered as a tool "station". Certain of the stations (such as 68, 69, 70 and 71, for instance) are provided with bolts 73' or other suitable attachment means whereby chosen tools may be interchangeably affixed to the individual stations. Of course, the shape of the turret may be altered to provide any number of angularly spaced stations, and the particular tools applied to any or all of those stations will depend upon the particular nature and sequence of operations to be performed on the given work.

We have here shown the following stationarily mounted tools; stop 74 on station 68, an end-facing tool 75 on station 72, a finishing reamer 76 on station 71, and a finishing facing tool 77 on station 69. As an essential part of our invention, we also provide one or more "live" tools on turret 62, and in the illustrated embodiment we show two such tools, one a blanking milling cutter 78 at station 73 and threading mill or hob 79 on the diametrically opposite station 70. The fact that we have here shown two such milling tools and the fact that, as will be described, both these tools are mounted on a single driven spindle, should in no way be taken as an indication that our invention is limited to such illustrated characteristics, though the mounting of the two milling tools on the single spindle is of decided advantage both as a feature of space and part economy and from the standpoint of giving superior bearing and balance to the drive spindle.

As will be seen by reference to Figs. 1 and 5, milling cutters 78 and 79 have tapered shanks 80 and 81, respectively, which are frictionally held in the complementary tapered bores 82 and 83, respectively, of spindle 84, this spindle having rotational bearing at 85 in hubs 86 on walls 70 and 73. Rings 87 bolted to said walls at 88, serve as removable bearing retainers and oil rings, while the spindle is held against end play by the fly wheel or inertia mass 89, which is pinned to the spindle by set screws 89', and gear 90, both gear and fly wheel being keyed to the spindle as indicated at 91 (Fig. 5). A reversible, variable speed motor 92 is mounted on the top plate 93 of turret 62 and is adapted to drive spindle 84 and hence cutters 78 and 79 through the following reduction gear train; gears 94, 95, 96, 97, 98, and 90, plate 93 being cut away as at 99 to allow gear 98 operatively to engage spindle-gear 90.

It will be seen that the mounting of fly wheel 89 within turret hollow 62' and on the spindle between the cutters, not only leads to economy of space and allows the single fly wheel to exert its movement-steadying, stored-up energy on both cutters, but it places that inertia mass at a most efficient point—that is, at a point close to the cutters and directly on their driving spindle, and also at a point adjacent to and between the spindle bearings, so, in spite of its weight, it has no appreciable bending effect on the spindle.

In Fig. 15 we have shown a variational embodiment wherein turret 62a has a spindle 84a mounted and driven in the same manner as that described in connection with Figs. 1 and 5 (with the spindle adapted to take cutters at opposite ends thereof, as previously described) but here station 72a is adapted to carry a "live" tool, the tapered shank of which is indicated at 72b. Shank 72b is adapted to have frictional fit in auxiliary spindle 100 which is mounted for rotation in bearing 101 carried by wall 72a. Held to spindle 100 by set screw 102 and key 102' is a bevel gear 103 which meshes with bevel gear 104 keyed at 104' to spindle 84a. Here, the fly wheel 89a is keyed to spindle 84a at 89b, and is held against longitudinal movement with respect to the shaft (and hence holds the shaft against endwise play through the turret) by means of set screw 89''. One end of the fly wheel is tapered as at 105 to accommodate gear 103. Spindle 84a gets its power from gear 90a in the same manner as that described in connection with spindle 84 and gear 90, and thus serves to drive both the tools carried at its opposite ends and the tool carried by auxiliary spindle 100. It will be noted that in the form of Fig. 1, gear 90 adds its mass to that of fly wheel 89 in a manner to contribute to the steadying or non-chattering effect on the cutter, as is also true of gears 90a and 104 of the form shown in Fig. 15. And it will also be noted that the fly wheel effect gained from these gears located within the hollow 100a of the turret is applied to the cutter spindle at the most advantageous points.

There are provided means whereby, when the turret is manually rotated to bring any given station and its tool into opposition with work W, the turret is automatically pegged in proper position, whereupon a clamp is operated to hold the turret solidly against platform 60 and thus take up all lost-motion or play. In base plate 63 of the turret there is provided a plurality of tapered sockets 107 corresponding, one each, to the "stations," these sockets being arranged concentrically about the vertical axis C—C which represents the axis of rotation of turret 62. A detent or indexing plunger 108, having a tapered head 109, is mounted for vertical reciprocation in platform bore 109', a spring 110, which encircles the shank 111 of detent 108 and is positioned within counterbore 112, serving to exert constant upward force on the detent. Thus, assuming a given station is in proper opposition to work W, detent head 109 will snugly fit the socket 107 wihch corresponds to that station (Fig. 7).

For freeing or clearing the detent we have provided an operating handle 113 which is adapted also to operate the turret clamp indicated generally at 114 (Figs. 7 and 11). This clamp is made up of two half-rings or bands 115 whose inner peripheral faces 116 are V-shaped to take the complementary, conical peripheral faces 117 and 118 of platform 60 and base plate 63, respectively. One set of opposed ends of bands 115 are connected by bolt 119, while the opposite ends of the bands carry lugs 120 and 121. A right-and-left-hand screw 122 is threadably taken by lugs 120, 121, while the hub 123 of handle 113 is non-rotatably mounted on the screw between lugs 120 and 121. The thread arrangement is such that when handle 113 is in the position of Fig. 7, screw 122 will have drawn lugs 120 and 121 toward each other a sufficient distance to tightly constrict the clamping bands about platform 60 and the base plate of the turret, thus preventing all relative movement between them and holding the turret in a position of full steadiness on the cross-slide.

When occasion arises for rotating the turret to bring the next succeeding station into opposition with the work, handle 113 is depressed from the position shown in Fig. 7. This movement serves to actuate screw 122 in a manner to unclamp bands 115 from the turret and platform, and a continuation of its downward movement swings projection 124 on hub 123 into engagement with arm 125 on bell-crank 126. This bell-crank is mounted for oscillation on pivot pin 127, and its arm 128, by virtue of the described clockwise movement of the bell-crank, acts against head 129 on detent-shank 111 in a manner to depress the detent against the action of spring 110 and thus to clear head 109 from socket 107.

The turret is then manually rotated and, of course, the under face 64 of plate 63 will hold detent 108 depressed until the socket 107 corresponding to the next station comes into register with counterbore 112. Thereupon, spring 110 will project the detent upwardly into that next socket 107 and will prevent further rotation of the turret, the spring being sufficiently strong to urge the detent upwardly and at the same time to act through bell-crank 126 to lift handle 113 slightly, though not into its clamping position. Thereafter, handle 113 is raised to the position of Fig. 7, thus acting, as has been described, to rotate screw 122 in a manner which constricts bands 115 about the platform and turret base and thus clamps them rigidly against relative movement in any direction.

When stop 130 on cross-slide 57 is engaged with stop 131 on saddle 21 (Figs. 1 and 6) the arrangement is such that the axis of any given turret-tool is in alinement with work or spindle axis A—A, that is, assuming detent 109 is in the corresponding socket 107. Or, of course, any other suitable stop or indexing means may be provided between the carriage and cross-slide whereby the operator may shift the cross-slide and its turret to a position where he is positive the tool axis will line up properly with the work axis.

Particularly when "live" tools such as the milling cutters are to perform their operations, it becomes essential that cross-slide 57 be shifted transversely with respect to bed 11. And, where cuts of predetermined taper are to be made by the tool, it is essential that the cross-slide and tool be fed transversely of the bed coincidently with and in accurately timed relation to the movement of the carriage longitudinally of the bed. We will now describe the means for accomplishing this cross feed both manually and automatically.

Figures 6, 9:
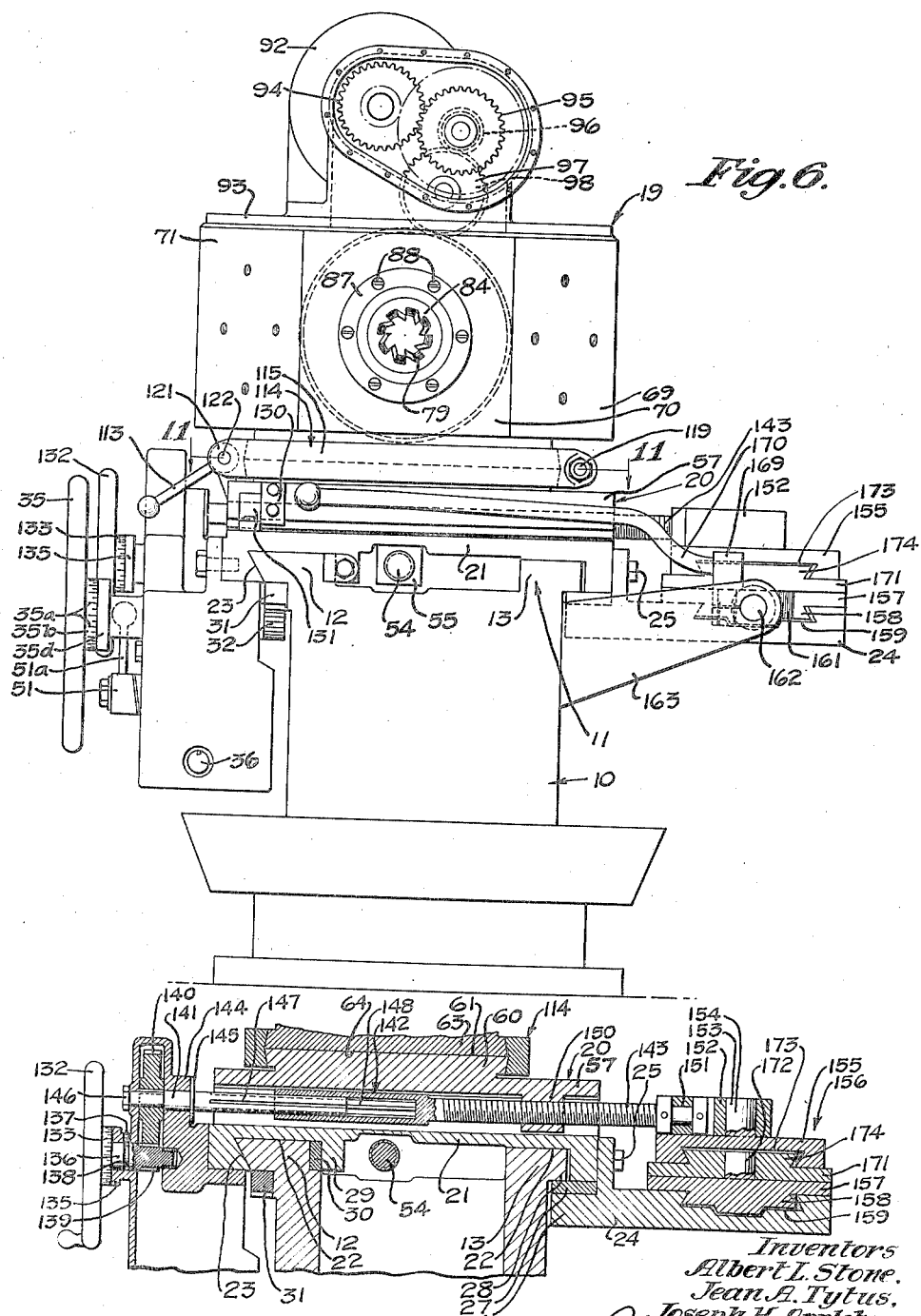
Fig. 6 is an end elevation of Fig. 5 as viewed from the right thereof.
Fig. 9 is a fragmentary section on line 9—9 of Fig. 1.

Referring to Fig. 9 it will be seen that cross-feed wheel 132 (whose hub is suitably graduated at 133 so its angular movement may be read by reference to index mark 134 on stationary apron-neck 135) is fixed to shaft 136 which is rotatably carried at its opposite ends by apron 34 in the manner clearly shown in Fig. 9. Set screw 137 extends into shaft-groove 138 to prevent endwise play of said shaft, the latter having gear teeth 139 which mesh with gear 140. Gear 140 is keyed to section 141 of the telescopic cross-feed shaft generally indicated at 142, the other section 143 of said shaft comprising the cross-feed screw. Shaft section 141 has bearing at 144 in apron 34 and is held against longitudinal movement with respect thereto by means of washer 145 and nut 146. The free end of section 141 is fluted as at 147; while shaft section or screw 143 is bored and fluted at 148 to receive the fluted portion of section 141, it following that section 143 may move bodily longitudinally toward and away from apron 34 and yet remain in rotative drive connection with section 141.

Shaft section 143 is threaded through the cross-feed nut 150 which is here shown integral with and depending from cross-slide 57. The outer end of screw 143 has swivel connection at 151 with block 152, the latter being pivoted at 153 on vertical stud 154 carried by slide-head 155 of the taper-attachment, generally indicated at 156. Since bracket 24, which makes up a part of the taper-attachment, is rigid with carriage 20, and since slide-head 155 is connected through block 152, rod 143, nut 150, and cross-slide 57 to the carriage, said bracket and head will move along with the carriage when the latter is moved longitudinally of bed 11.

Mounted for sliding movement on top bracket 24 and in a path parallel to ways 12 and 13, is slide-plate 157, said plate being confined to the described path by reason of its dove-tail interfit 158 with channel 159 cut in the upper face of bracket 24. The right hand end of plate 157 (as viewed in Fig. 1) is provided with a bore 160 which is continued through and to the end of plate-extension 161. This bore is adapted to take, with sliding fit, a rod 162 which is anchored to the end of frame 10 by bracket 163.

We have provided means for releasably clamping extension 161 and hence plate 157 to rod 162 when the taper attachment is to be put into operation. This clamp is shown in Figs. 1 and 10. The outer end 164 of extension 161 is in the form of a split ring or clamp having spaced side lugs 165 and 166. A clamping screw 167 is threaded into lug 166 while its upper end passes with working clearance through bore 168 in lug 165. Screw 167 has a head 169, and an extension lever 170 extends from this head to the opposite or operator's side of the machine. It will be seen that by swinging lever 170 in a clockwise direction, as viewed in Fig. 1, screw 167 will move lug 166 toward lug 165, thus drawing split clamping ring 164 into tight binding engagement with rod 162 and thereafter preventing relative longitudinal movement between that rod and plate 157. On the other hand by swinging lever 170 in the opposite direction, the clamping screw loosens the split ring 64 from about rod 162, whereupon relative longitudinal movement is permitted between rod 162 and plate 157.

Resting between plate 157 and slide-head 155 is a taper adjustment plate or rail 171, this plate being centrally pivoted on stud 172 which extends upwardly from and is integral with plate 157. Slide head 155 has a longitudinally extending and downwardly opening dove-tail channel 173 which interfits with a complementary way 174 extending longitudinally along the upper side of plate 171. Plate 171 stops a little short of the left hand end of plate 157 (as viewed in Fig. 1) and is provided with an arcuate slot 175 which is struck about stud 172 as a center, this slot accommodating the clamping bolt 176 which extends into threaded engagement with plate 157. It will be seen that, after loosening bolt 176, plate 171 may be swung about stud 172 as a center to vary the inclination of plate 171 with respect to the longitudinal axis of bed 11. Gage marks 177 and 178 on plate 157 and 171, respectively, indicate the extent of angle to which the plate or rail 171 is set.

Now assume that it is desired to manually feed cross slide 57 transversely of bed 11 during a time at which there is no coincident longitudinal movement of carriage 20. By rotating cross-feed wheel 132, shaft section 141 is rotated through gears 139 and 140 and, due to the fluted or sliding key connection between sections 141 and 143, this results in rotation of section 143. Since the outer end of shaft section 143 is held against transverse displacement with respect to carriage 20 through its mounting on the taper attachment as previously described, this rotation of shaft 143 acts through nut 150 to feed cross slide 57 transversely of carriage 20, the direction of movement depending of course upon the direction in which wheel 132 is rotated.

If it happens that this manual cross feeding is to be accomplished during coincident movement of the carriage 20 longitudinally of bed 11, it is necessary to release the taper attachment by swinging lever 170 in a direction to unclamp ring 164 from rod 162. Then, during the longitudinal movement of the carriage and the coincident movement of bracket 24 and slide head 155, plates 157 and 171 are merely carried bodily along with that bracket and slide head without interference and without disturbing the hand-feed of the cross slide 57. During such movement, of course, extension 161 and plate 157 merely slide idly along rod 162.

On the other hand, when the taper attachment 156 is to be put into play so the cross slide will automatically travel transversely with respect to bed 11 coincidently with the movement of the carriage 20 longitudinally along that bed (plate 171 having been previously rotated about stud 172 and clamped by bolt 176 in such position that the proper angle per foot is indicated at 177, 178), lever 170 is swung in a direction to clamp ring 164 to rod 162. As a result of this clamping, plates 157 and 171 are held against relative longitudinal movement with respect to the lathe bed and, accordingly, as the carriage is shifted longitudinally of bed 11, head 155 will slide along angled rail or plate 157 and will thrust or pull (depending upon the direction in which slide head 155 moves and upon the position to which plate 171 has been rotated during the setting operation) upon block 152 and rod section 143, which thrust or pull reacts on nut 150 to shift cross-slide 57 transversely of carriage 20 in one direction or the other. During such bodily longitudinal movement of shaft section 143, it will be evident that the telescopic joint 142 will be extended or contracted so that no endwise thrust or pull will be exerted on shaft section 141.

It is evident that the degree of inclination of plate 171 with respect to the longitudinal axis of plate 157 and hence to the longitudinal axis of bed 11, determines the ratio of the extent of transverse cross-slide movement to the extent of longitudinal movement of the carriage with respect to bed 11, and thus determines the angle of the taper cut by a turret-tool. In the example shown, the setting is such that the turret moves transversely approximately one-half inch while the carriage travels longitudinally one foot, giving a taper cut of one-half inch to the foot.

Of course, if plates 171 and 157 are lined up and clamped so they are axially parallel, clamp 164 need not be loosened while the cross slide is manually operated, for under such circumstances the taper attachment will not cause longitudinal shifting of cross-feed screw 143 even though the carriage 20 be moved longitudinally of bed 11. Consequently under such conditions, the cross slide may be manually shifted by rotating wheel 132 even though the carriage 20 be coincidently moving longitudinally of bed 11.

We will now describe the means for rotating work-spindle 16 and, through that spindle, selectively operating either feed bar 36 or lead-screw 54. A gear box 200 is secured by bracket 201 to one side of frame 10 (Figs. 1 and 3), and supports a power shaft 202 driven from any suitable source such as a reversible motor (not shown) upon which shaft are mounted the change-speed gears 203, 204 and 205. Companion gears 206, 207 and 208 are slidably mounted on but keyed to a jack shaft 209, also supported by box 200, and a gear shift lever 210 is connected to shifter fork 211 whereby a selected gear on shaft 209 may be meshed with its companion gear on shaft 202, thus giving an ample range of speed to shaft 209 with given motor speed.

Mounted in bearings 212 on the side of head stock 14 is a worm shaft 213 carrying a gear 214 which is constantly in mesh with gear 215 on jack shaft 209 and with gear 216 which is rotatively mounted on work spindle 16 (Figs. 1 and 4). Gear 216 has side clutch teeth 217, while worm 218 on shaft 213 meshes with worm wheel 219 (Figs. 1 and 3) on shaft 220 which has bearing in head stock 14 and carries an integral worm portion 221. Worm 221 meshes with worm wheel 222 which is mounted for rotation on spindle 16 and has side clutch teeth 223. It will thus be seen that free-running gears 216 and 222 are constantly rotated as long as jack-shaft 209 is rotated, though, for a given speed of shaft 209, the angular velocity of worm wheel 222 will be very decidedly less than that of gear 216. Worm wheel 222 and gear 216 are held against relative movement toward or away from each other as by key 226.

As will appear, gear 216 is utilized for driving spindle 16 when "turning" operations are being carried out, while worm wheel 222 is used for driving the work spindle when "milling" operations are to be performed. As a means for selectively imparting the drive from gear 216 or worm wheel 222 to spindle 16, we provide the selective clutch 224 which includes a ring 225 slidably mounted on spindle 16 but keyed thereto at 226 (Fig. 4), ring 225 being between and selectively slidable toward and away from gears 216 and 222. The opposite sides of clutch ring 225 have clutch teeth 228 and 229, and a shifting fork 230 is carried by sleeve 231 which is slidably mounted on rod 232, the latter being carried between uprights 233 and 234 of head stock 14. When clutch ring 225 occupies a median position between gears 216 and 222, as determined by the entrance of spring-pressed detent 233' in rod groove 234' (Fig. 4) and to which position it may be moved by manipulation of shifting handle 235 on sleeve 231, the clutch ring is free of clutch teeth 217 and 223, it following that gear 216 and worm wheel 222 merely rotate idly about spindle 16. When the clutch ring 225 is shifted to the left (the position shown in Figs. 1 and 4) where it is releasably held by the entrance of detent 233' in rod groove 237, the drive is imparted from worm wheel 222 through clutch teeth 223 and 229 to clutch ring 225 which, through its key connection 226, drives spindle 16.

On the other hand, when sleeve 231 is moved to the right, (as viewed in Fig. 4) to a position where detent 233' engages rod groove 240, clutch teeth 217 are engaged with clutch teeth 228 and gear 216 is thus adapted to rotate clutch ring 227 and thereby, through key 226, to drive spindle 16.

We will now describe the selective drive from spindle 16 to lead-screw 54 or feed bar 36. The wide face gear 241 on the outer end of spindle 16 is adapted to mesh constantly with gear 242 which is slidably and rotatably mounted on shaft 243 extending from head-stock upright 233. A sleeve 244 integrally connects gear 242 with the smaller gear 245, and is provided with a central groove 246 to take a shifter fork 247 mounted on the slide rod 248, the latter being slidably mounted in upright-carried bearings 249 and having a shift lever 250.

Figure 3:
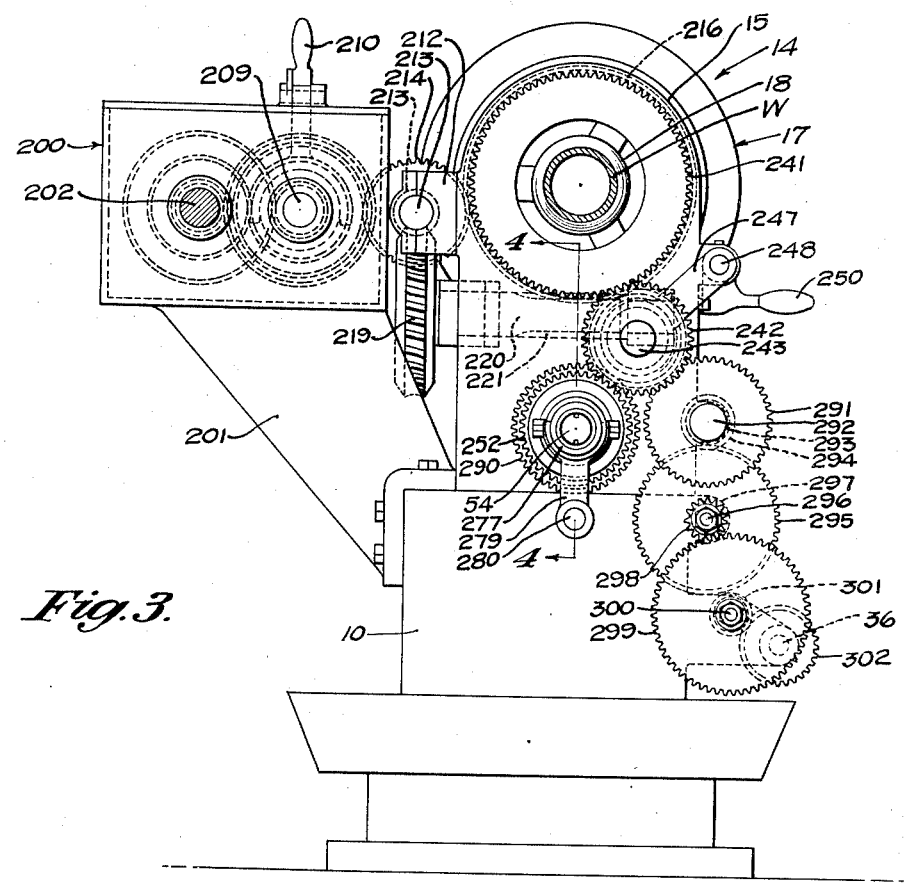
Fig. 3 is an end elevation of Fig. 2, as viewed from the left thereof.

In the position shown in Figs. 2 and 3, shift lever 250 is in such a postion that gear 242 is in mesh with gear 252, the latter being bolted at 253 to the end of hollow spindle 254 of the lead-screw clamping device indicated generally at 255. It follows that rotation of spindle 16 causes coincident rotation of gear 252 and spindle 254, the latter having bearing at 256 in upright 233 (Fig. 4) and being held against lengthwise movement by washers 257 and 258, the latter being retained in position by nut 259.

Collet chuck 260 is mounted within the bore of spindle 254, its longitudinally split and tapered head 261 being taken within the tapered counterbore 262 of the spindle. The unthreaded portion 54' of lead-screw 54 extends through the bore 263 of collet 260 and has longitudinally extending key-ways 264 which take keys 265 carried by ring 266, the latter being bolted at 267 to the end of spindle 254. When collet chuck 260 is out of radial clamping engagement with lead-screw 54, rotation of spindle 254 causes coincident rotation of lead-screw 54 through keys 265, but since at this time the lead-screw is capable of relative longitudinal movement with respect to collet 260 and spindle 254, the rotation of this lead-screw causes it to feed back or forth through nut 55, the unthreaded portion 54' merely moving idly back or forth through the smooth collet bore while the carriage remains stationary. Likewise when the collet is out of clamping engagement and the carriage is shifted by the feed bar or by actuation of wheel 35, the lead-screw will be moved by carriage nut longitudinally and freely through the collet bore.

However, when it is desired to feed the carriage longitudinally by virtue of lead-screw rotation (and at such time spindle 16 will normally be driven at relatively low speed through worm wheel 222) it is only necessary to clamp the lead-screw to spindle 254 to hold them against relative longitudinal movement, whereupon rotation of the lead-screw reacts with carriage nut 55 in a manner to shift carriage 20 longitudinally of bed 11. At such times, of course, clutch 43 of the feed-bar drive is disengaged.

This clamping of the lead screw to spindle 254 is accomplished in the following manner. Gear 252 has an internal annular groove 270 into which fit the spherical ends of arms 271 of bell cranks 272, the latter being pivoted at 273 to a ring 274 threaded on collet 260. The longer arms 275 of cranks 272 are connected by links 276 to a collar 277 which is slidably mounted on collet 260 and has an annular groove 278 adapted to take a shifter fork 279 carried on rod 280. This rod is supported for sliding movement at 281 through upright 233 and has a manipulating handle 282 which extends to the exterior of side plate 283 (Fig. 2).

Fig. 4 shows the condition of the clamping means when collet 260 is out of clamping engagement with the lead-screw, that is, the collet is not radially compressed to a degree effectively resisting relative longitudinal movement between collet and lead-screw.

When handle 282 is lifted to clear it from plate notch 284 and then shifted to the right (as viewed in Fig. 2) and dropped into the retaining notch 285, rod 280 is drawn to the right in Fig. 4, which causes coincident and like movement of collar 277. This movement of the collar acts, through links 276, to swing the upper bell crank 272 in a clockwise direction and the lower crank in a counter-clockwise direction. These cranks, being fulcrumed at 271 in the longitudinally stationary gear 252, move pivot points 273 to the left, as viewed in Fig. 4, thus carrying collar 274 and collet 260 to the left as viewed in this figure. The tapered and split head 261 of the collet is thus drawn further into conical bore 262 and is radially contracted into clamping engagement with lead screw 54 and, of course, the collet head is at the same time tightly frictionally engaged with spindle 254, it following that relative longitudinal movement is prevented between the lead-screw and spindle 254. Consequently rotation of the now longitudinally fixed lead-screw causes that screw to coact with nut 55 in a manner to feed carriage 20 longitudinally of the bed. Angular movement of spindle 254 is imparted to screw 54 by keys 265, though it will be evident that the friction-tight fit of the collet with both spindle and lead-screw may, if desired, be depended upon to impart this rotary drive.

As an example, all the gear ratios and threads may be such that with spindle 16 driven by worm wheel 222 and with gear 242 engaged with gear 252, carriage 20 will be advanced along bed 11 exactly the right amount, during one revolution of spindle 16 to mill a thread of given pitch. On the other hand, if the shifter fork 247 be moved to its extreme position to the left (dotted lines in Fig. 2) gear 242 will remain in mesh with gear 241 but will be carried out of mesh with gear 252. However, in this extreme left-hand position, gear 245, which is smaller than gear 242, will be brought into mesh with gear 290 which is larger than gear 252 and is held to clamping spindle 254 by bolt 253. With this changed gear ratio, the carriage 20 will be fed along bed 11 a lesser distance per revolution of work spindle 16, thus adapting the machine to cut a thread of a pitch different from that cut when spindle 254 was driven directly from gear 242.

It will be seen that in either of the described positions of gears 242 and 245, there is no driving connection between spindle gear 241 and the first gear 291 of the gear train which is adapted to drive feed bar 36. However, if shift lever 250 be moved to an intermediate position, gears 242 and 245 will be moved out of mesh with gears 252 and 290, respectively, while gear 245 will be moved into mesh with gear 291, the latter being mounted on shaft 292 supported on upright 233 by bearing 293. Also keyed to shaft 293 is a pinion 294 which meshes with gear 295 on shaft 296, the latter having bearing at 297. Change-gears 298 and 299 are replaceably held on shafts 296 and 300, respectively, the latter having bearing in frame 10. Shaft 300 carries pinion 301 which meshes with gear 302, the latter being keyed to feed bar 36. The gear ratio from spindle gear 241 to feed bar gear 302 is such that the carriage may be advanced by that feed bar at a rate properly related to the angular velocity of work spindle 16 in performing given "turning" operations. By substituting change gears of different diameters than those shown at 298 and 299, it will be apparent this ratio of work-spindle speed to carriage travel may be varied between wide limits.

In describing the following sequential operations on the particular type of work we have chosen to illustrate, it will be understood this is done merely by way of giving a typical example, and in no way intended to infer that the machine is limited in its use to this particular sequence of operations nor that, in producing the final result here shown, the operations need be exactly those described. As has been said, it is assumed that work W is in the form of a well pipe having an integral upset box 18 which has formed therein a two-step, tapered thread. The two steps of the finished thread are indicated at 305 and 306 in Fig. 12, where work W is shown as engaged by facing tool 77, the finished joint also having an internal conical seat 307 and an external conical seat 308.

Figure 12:
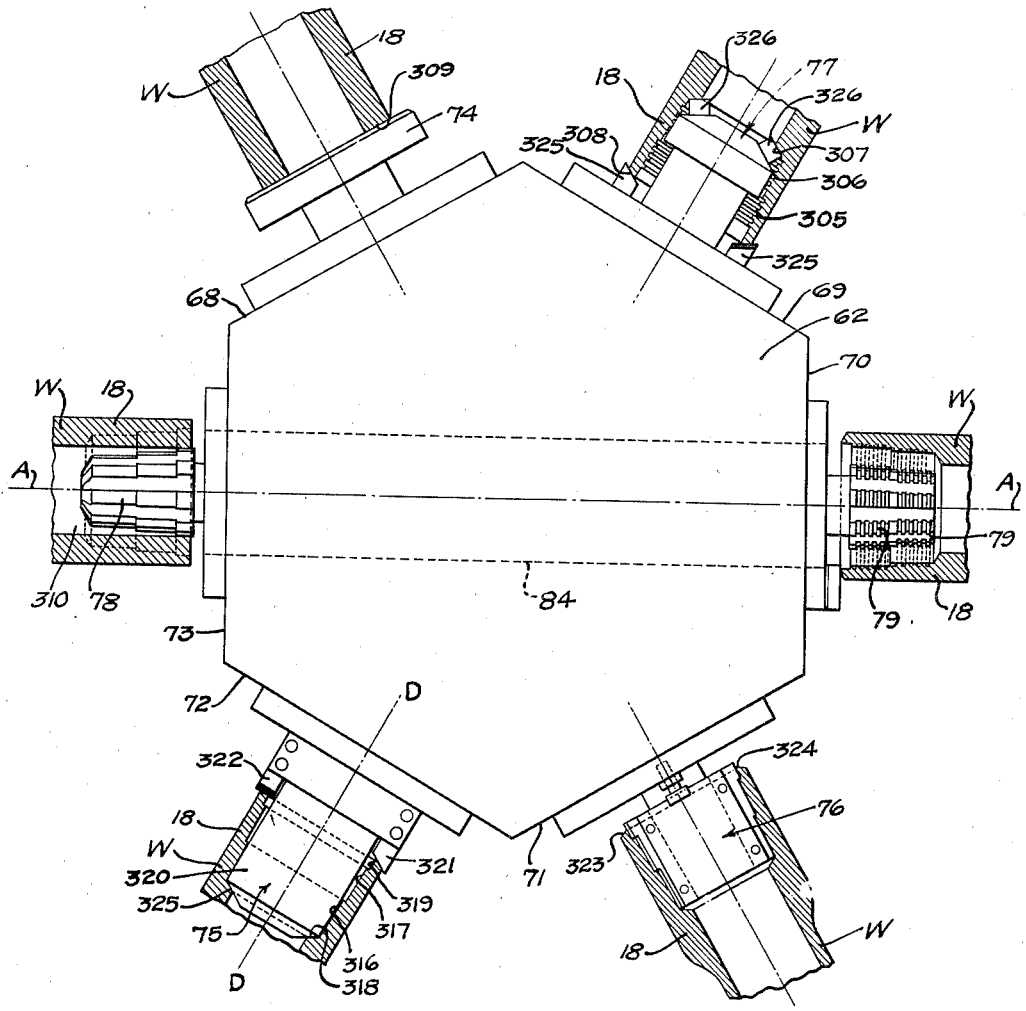
Fig. 12 is a schematic view of the tool-turret illustrating the manner of forming sequential operations on given work.

In order to simplify the showing, the schematic lay-out of Fig. 12 indicates that the work is coincidently at the several "stations", but the following description will proceed as though Fig. 12 showed the work in its normal position and the turret rotated to bring the tools individually and successively to the work.

The turret is first rotated to a position where stop 74 is in opposition to the work, it being understood that turret-clamp 114 and indexing detent 108 are operated between each angular movement of the turret to present different stations in oppositions to the work, in the manner previously described. Before the work is chucked up, it is thrust through spindle 16 until its square-cut end 309 engages stop 74, thus locating the work endwise in proper relationship with the turret when the latter is moved into operative position.

Figure 13:
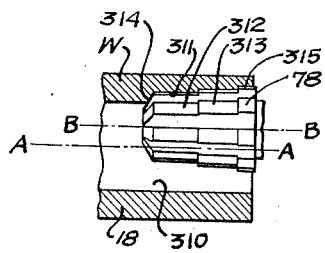
Fig. 13 illustrates one of the steps in a milling operation performed with our device.

After chucking the work, the turret is moved by racking carriage 20 to the right, as viewed in Fig. 1, and is rotated to bring blanking mill 78 into opposition with the work. At this time, cross slide 57 is put in such position that stop 130 engages stop 131, it thus being assured that mill 78 is axially alined with the work. The turret is then shifted toward the head stock by proper movement of carriage 20 until the mill is within work bore 310, as shown in Fig. 12. While the work is being rotated relatively slowly through worm wheel 222 and spindle 16 and the mill 78 is being rotated relatively rapidly by motor 92, cross-slide 57 is fed transversely of bed 11 to shift it into the position of Fig. 13, where it will be seen that it will take a milling cut such as indicated at 311. The cut is initially made by "plunging" the mill into the work as shown in Fig. 13, and then, as the work revolves relatively slowly, this cut is extended about the entire periphery of the box. The cutter 78 has tapered steps 312 and 313, a tapered end 314, and a cylindric portion 315, it resulting that when the milling operation is complete there will be formed in the pipe the tapered steps 316 and 317, the internal conical shoulder 318, and cylindric counterbore 319.

When this cut is complete, the turret is backed away from the work and rotated to bring station 72 into opposition with work W. The cross-slide is manipulated to bring it back to its original position so the axis D—D of facing tool 275 is in alinement with axis A—A. The work is then rotated at relatively high speed, by proper control of the head stock driving mechanism previously described, and the carriage is again shifted (either manually or by feed-bar operation) toward the work to enter gage plug 320 of tool 75 in the bore of box 18. Tool 75 includes inclined end-face cutter 321 and square cut end-face cutter 322, which make the taper cut 323 and square cut 324, respectively, on the end of box 18, this cutting continuing until the end 325 of plug 320 engages shoulder 319 as a stop, it following that end faces 323 and 324 are in proper relationship with internal face or seat 319.

The turret is then backed away from the work and rotated to present reamer 76 thereto. The work is rotated at approximately the same speed as it was in making the cuts with tool 75, and reamer 76 is of such a nature that it accurately reams the bores and counterbores of box 18 (as originally relatively roughly cut by blanking mill 78) to finished diameters.

Then the turret is backed away from the work and rotated to bring threading mill or hob 79 into opposition therewith. The following steps in performing the threading operations need not be followed exactly, as they are given here merely as illustrative of one way in which the final end may be accomplished. While the work is held against rotation and the hob 79 is likewise at rest, the turret is moved toward the head stock with the hob axis lined up with axis A—A so the hob may be moved freely into the box bore with the smaller end of the mill opposite the point in box 18 where the thread is to start. Cross-slide 57 is then operated to shift the turret transversely of bed 11 until the hob just touches or just clears the inner periphery of the box bore, whereupon the hob is brought up to speed by motor 92.

Figure 14:
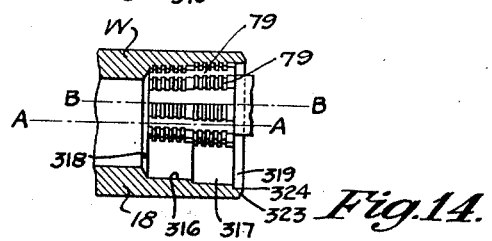
Fig. 14 illustrates a thread milling operation performed with our device.

Clutch ring 225 will have been moved into engagement with worm wheel 222 so the angular velocity of the work spindle when it is started into motion will be extremely slow, as will also be the angular velocity of gears 241 and 242. With the hob rotating and just touching or just clearing the work, the operator proceeds to take the following steps approximately simultaneously; (1) he puts the work spindle into rotation (2) he engages the taper attachment 156 by manipulating lever 178 in a manner to clamp ring 164 on rod 162 (3) he engages clamping collet 260 with lead screw 54 by proper manipulation of shift-handle 282 (gear 242 will either be in the position shown in full lines in Fig. 2 or will have been shifted to the position of dotted lines therein in order that either lead-screw gear 252 or 290 will be engaged by gear 242 or gear 245, respectively) and, (4) he will make a plunge cut with the hob into the work by a rapid feeding of cross-slide 57 transversely of bed 11, so hob 79 occupies the position shown in Fig. 14. Then, as the work is slowly revolved, and as the taper attachment (which has been set so that the taper feed of the hob will correspond to the taper of cuts 316 and 317) causes proper angular or transverse movement of the hob while the carriage is being slowly fed longitudinally away from the work by lead-screw 54, threads 305 and 306 will be cut in box 18 by the time the work has made one complete revolution, though the longitudinal feed of the hob and the rotation of the work are continued until the work has rotated slightly more than one complete revolution in order to overlap the points where the plunge cut was started. Of course, if desired a first rough cut may be made by the hob, followed by a finishing cut which will bring the threads accurately to proper depth.

When the hobbing operation is complete and the turret has been shifted to clear the hob from the work, the turret is rotated to bring tool 77 into opposition with box 18 and the cross-slide is shifted to bring the axis of that tool into line with axis A—A. The gearing is then changed to give relatively greater angular velocity to the work, and, with the work at "turning speed," the turret is fed toward the headstock to engage tool 77 with box 18, as in Fig. 12. End cutters 325 and 326 are adapted to make finishing facing cuts on shoulders 308 and 307, it being noted that tool 77 also positively and finally insures the proper longitudinal spacing of said shoulders. With the finishing cuts completed by tool 77, the turret is backed away from the work and the latter is unchucked from spindle 16.

It will be seen that all the above operations have been accomplished with but a single chucking of the work and that the complete cycle of operations has included roughing and finishing cuts and both turning and milling operations, whereby all the advantageous ends, spoken of in the introduction to this specification, are accomplished. Other advantages will also be recognized by those skilled in the art.

However, it will be understood that various changes in design, structure and arrangement of the various elements entering into the machine, may be made without departing from the spirit and scope of the appended claims.

We claim:

1. In combination, a lathe bed, a rotatable work-taking head supported on the bed, a carriage on said bed and movable longitudinally thereof towards and away from said head, a turret rotatably mounted on the carriage, said turret being shiftable transversely of the carriage, means for so shifting the turret, a plurality of tool stations spaced angularly about the turret and movable, by rotation of the turret, successively into opposition with the work, cutting tools at said stations, one, at least, of said tools being rotatably mounted in the turret, and a prime mover on said turret and connected to said one tool for rotatably driving it.

2. In combination, a lathe bed, a rotatable work-taking head supported on the bed, a carriage on said bed and movable longitudinally thereof towards and away from said head, a turret rotatably mounted on the carriage, a spindle rotatably supported in said turret and extending diametrically thereacross, said spindle being adapted to carry a pair of cutters, one each, at the opposite ends of the spindle, an inertia mass on the spindle between its ends, and means for rotating said spindle, said ends of the spindle being selectively movable into opposition with the end of the work by rotation of the turret.

3. In a mechanism for application to the bed of a machine having a work-rotating head, a turret adapted to be rotatably mounted on the bed at a point opposite the head, a plurality of tools angularly spaced about the turret, one, at least, of said tools being mounted for rotation on the turret, a prime mover on and rotatable with the turret, and drive connective means on the turret between said prime mover and said one tool for drivingly rotating said one tool.

4. In a mechanism for application to the bed of a machine having a work-rotating head, a hollow turret adapted to be rotatably mounted on the bed at a point opposite the head, a plurality of tools angularly spaced about the turret, one, at least, of said tools being mounted for rotation on the turret, power-driven rotating means within the turret-hollow and operatively connected to said one tool for rotatively driving it, and a prime mover carried on said turret and operatively connected to said rotating means for rotating it.

ALBERT L. STONE.
JEAN A. TYTUS.
JOSEPH H. APPLETON.